July 27, 1954  R. L. WILSON  2,684,734
WHEEL LOCK FOR MECHANIC'S CREEPERS
Filed June 22, 1951

INVENTOR
ROBERT L. WILSON,
BY
McMorrow, Berman + Davidson
ATTORNEYS

Patented July 27, 1954

2,684,734

UNITED STATES PATENT OFFICE 2,684,734

WHEEL LOCK FOR MECHANIC'S CREEPERS

Robert L. Wilson, Jackson, Tenn.

Application June 22, 1951, Serial No. 232,937

2 Claims. (Cl. 188—74)

This invention relates to mechanic's creepers and more particularly to a mechanic's creeper having manually operated wheel locks for holding the creeper against movement when desired.

It is among the objects of the invention to provide an improved mechanic's creeper having supporting caster wheels mounted one at each corner thereof and wheel locking means carried by the creeper and including handles disposed intermediate the length of the creeper and one at each side thereof for manually locking and releasing the wheels; which wheel locking means can be applied to an existing creeper with no material modification of the creeper construction; which is effective to hold the creeper wheels against rotation regardless of the angular position of the caster wheels; and which is strong and durable in construction, economical to manufacture and easy to operate.

Other objects and advantages will become apparent from a consideration of the following description and the appended claims in conjunction with the accompanying drawing wherein:

Figure 1:
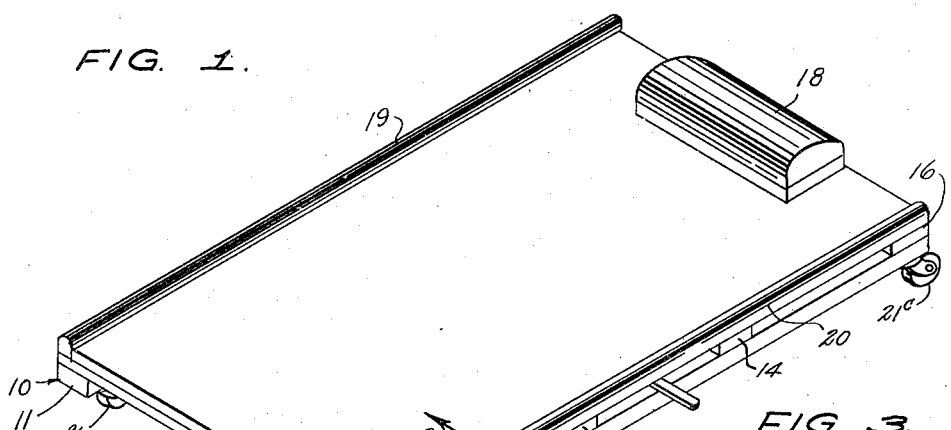
Figure 1 is a perspective view of a mechanic's creeper illustrative of the invention.

With continued reference to the drawing, the creeper comprises a frame, generally indicated at 10, and including a pair of spaced apart and substantially parallel longitudinal frame members 11 and 12 of elongated, rectangular cross sectional shape, a pair of cross members 13 and 14 extending between the side members 11 and 12 intermediate the length of the side members and disposed one at each side of the mid-length location of the frame and end cross members 15 and 16 extending between the side members, one at each end of the frame.

A platform 17 in the form of a flat plate of rectangular shape is mounted on the cross members of the frame and a head cushion 18 is mounted on the platform at one end of the latter.

It is to be understood that the platform 17 may comprise a one-piece plate of suitable material, such as plywood, which may be padded on its upper surface, if desired, or may comprise spaced apart slats or such other construction as may be desired.

Side rails 19 and 20 extend one along each longitudinal edge of the platform 17 and have transversely rounded upper edges.

Caster wheel assemblies, generally indicated at 21, and designated at 21a, 21b and 21c in Figure 1, are disposed one at each corner of the rectangular creeper, each caster wheel assembly being mounted on the under surface of a frame side member and there being one caster wheel assembly at each end of each of the frame members 11 and 12.

Figure 2:
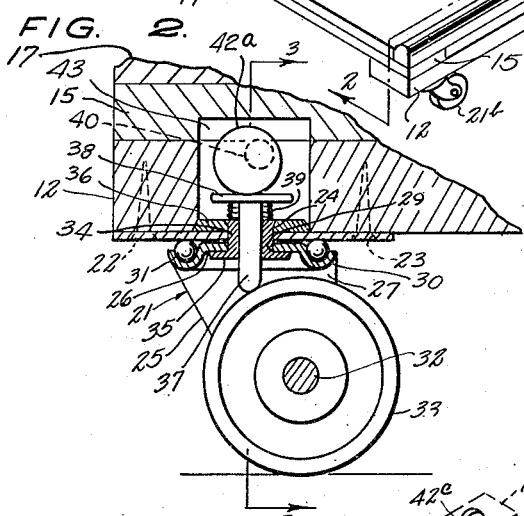
Figure 2 is a fragmentary cross sectional view on an enlarged scale on the line 2—2 of Figure 1.
Figure 3:
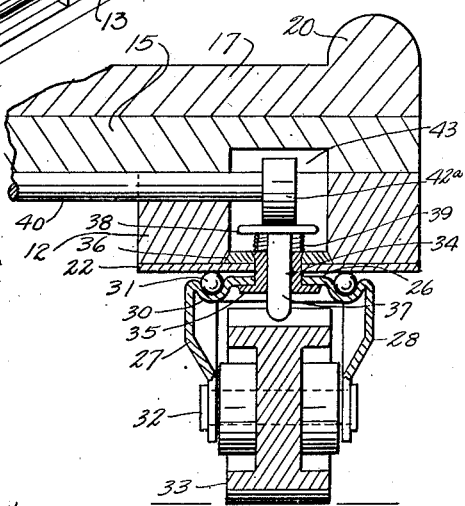
Figure 3 is a fragmentary cross sectional view on the line 3—3 of Figure 2.
Figure 4:
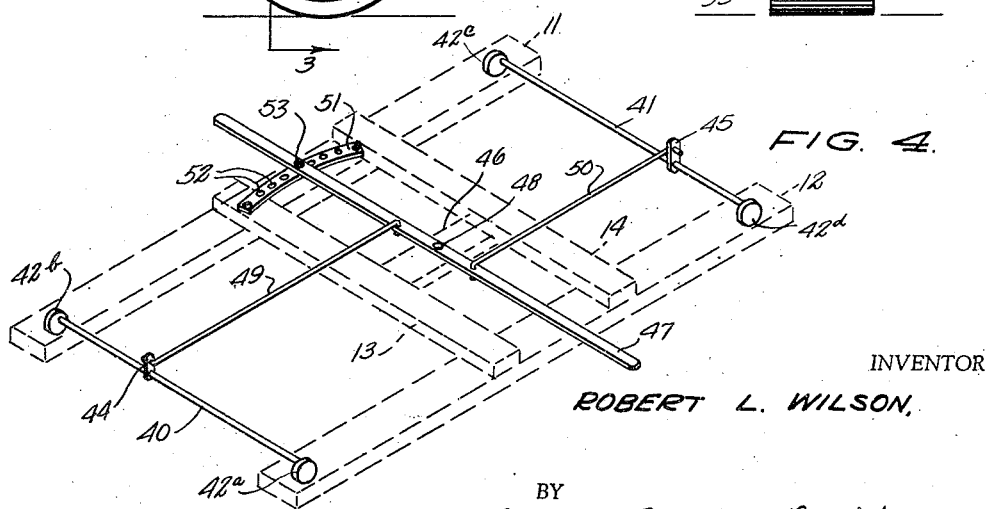
Figure 4 is a diagrammatic cross sectional view showing the arrangement of the wheel lock actuating members in the creeper.

Each caster wheel assembly, as is particularly illustrated in Figures 2 and 3, comprises a rectangular bearing plate 22 secured to the under side of the corresponding frame side member, such as the side member 12, by suitable means, such as the wood screws 23, and provided at its center with an aperture 24. A wheel fork 25 is disposed below the bearing plate 22 and includes an intermediate or bight portion constituting a bearing plate portion 26 and a pair of legs 27 and 28 extending in the same direction from the intermediate portion in spaced apart and substantially parallel relationship to each other. The intermediate portion 26 is provided with a central aperture 29 and a circular groove formation 30 concentrically surrounding the central aperture. Bearing balls 31 are disposed in the groove formation 30 of the intermediate portion of the wheel fork and are positioned between the bearing plate portion of the wheel fork and the bearing plate 22 to provide an antifriction bearing between the wheel fork and the frame of the creeper, so that the caster wheels can swivel easily on the creeper frame.

An axle 32 is secured at its ends in the fork legs 27 and 28 at a location spaced from the intermediate fork portion 26 and a wheel 33 is disposed between the legs 27 and 28 and journaled on the axle 32.

A bushing 34 extends through the apertures in the bearing plate 22 and the bearing plate portion 26 of the wheel fork and has at one end an outwardly projecting annular flange 35 bearing against the sides of the intermediate portion 26 of the wheel fork remote from the bearing plate 22. A washer 36 is secured on the other end of the bushing 34 and bears against the upper side of the bearing plate 22 remote from the wheel fork, the flanged bushing and washer together constituting an eyelet or swivel means securing the wheel fork to the bearing plate for turning movements of the fork relative to the bearing plate.

A plunger 37, in the form of a cylindrical pin, is slidably mounted in the eyelet including the bushing 34 and has a rounded end adjacent the periphery of the wheel 33. A flat head 38 is provided on the other end of the plunger and a coiled compression spring 39 surrounds the plunger between the head 38 and the adjacent end of the eyelet bushing and resiliently urges the plunger in a direction away from the assosociated wheel 33. There is a similar locking plunger slidably mounted in each caster wheel assembly for locking engagement with the corresponding wheel.

Shafts 40 and 41 extend transversely of the creeper frame one at each end of the frame, each shaft extending along the adjacent end cross member 15 or 16 of the frame and these shafts are journaled at their ends in the frame side members 11 and 12.

Cylindrical cams, as indicated at 42a, 42b, 42c, and 42d, are eccentrically mounted, one on each end of each of the shafts 40 and 41 and engage the upper surfaces of the corresponding plunger heads. The frame side members and the end cross members of the frame are recessed, as indicated at 43 in figures 2 and 3, to receive the plunger heads and the corresponding cams and the springs 39 hold the plunger heads in contact with the cams.

An arm 44 projects radially from the shaft 40 intermediate the length of this shaft and is provided with an aperture near its distal end and a similar arm 45 projects radially from the shaft 41 intermediate the length of the latter and is provided with an aperture near its distal end.

A block 46 extends between the intermediate cross members 13 and 14 at the mid-width location of the frame and a lever 47 is pivotally mounted at its mid-length location on the block 46 substantially at the center of the creeper frame 10 by a pivot bolt or pin 48. This lever projects beyond the frame side members 11 and 12 at the opposite sides of the frame to provide outwardly extending handles for manually imparting angular movements to the lever about the axis of the pivotal connection provided by the pin or bolt 48. The lever is provided with apertures disposed one at each side of the pivot pin 48 and a link 49 connects the distal end of the arm 44 to the lever at one side of the pivot pin while a similar link 50 connects the distal end of the arm 45 to the lever at the other side of the pivot pin, these links having offset end portions received in the apertures in the arms and the lever.

A locking plate 51 is mounted on the side of the frame side member 11 adjacent the lever 47 and is provided with an arcuate series of spaced apart apertures or recesses 52 extending longitudinally of the frame side member and the lever is provided with a pin or detent 53 selectively engageable in the recesses or apertures 52 to releasably lock the lever in selected positions of adjustment relative to the locking plate.

With this arrangement, by manually moving either end of the lever 47 in either direction from a central or neutral position, the locking plungers can be forced downwardly to engage the caster wheels and simultaneously lock all of the caster wheels against rotation, the lever being releasably held in wheel locking position by engagement of the detent 53 in one of the recesses or apertures 52 in the plate 51. When the lever is manually returned to its centered or neutral position, all of the wheels are released and the creeper may then be easily moved to a different loctaion.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a mechanic's creeper including a rectangular frame and caster wheel assemblies mounted one at each corner of the frame and each having a swivel connection including a tubular eyelet, wheel locking means comprising plungers disposed one in each tubular eyelet with its lower end engageable with the associated wheel and its upper end provided with a head formation received in a recess in said frame, shafts disposed one at each end of said frame and extending transversely of said frame with their ends journaled in said frame adjacent the corresponding frame recesses receiving the plunger heads, cams mounted one on each end of each shaft and disposed in the corresponding frame recesses in engagement with the corresponding plunger heads for forcing said plungers into engagement with the corresponding wheels upon rotational movements of said shafts in a predetermined direction, a hand lever pivotally mounted on said frame for swinging movements about an axis substantially perpendicular to the plane of said frame and projecting at at least one end outwardly of said frame to provide an operating handle for the wheel locking means, means connecting said lever to said shafts for imparting rotational movements simultaneously to said shafts upon swinging movement of said hand lever, and means carried by said frame and engaged by said hand lever to releasably secure said hand lever in selected angular positions about the axis of the pivotal connection between said hand lever and said frame.

2. In combination with a rectangular frame and caster wheel assemblies mounted on said frame one at each corner thereof and each including a rotatably and swively mounted wheel and manually actuatable wheel locking means, shafts extending transversely of said frame one at each end thereof and journaled at their ends on said frame adjacent the corersponding caster wheel assemblies, means on the ends of said shafts engaging the corresponding wheel locking means and effective to actuate said wheel locking means upon rotational movements of said shafts, a hand lever pivotally mounted on said frame between said shafts for swinging movements about an axis substantially perpendicular to the plane of said frame and projecting at at least one end beyond the adjacent side of said frame, means connecting said hand lever to said shafts for simultaneously imparting rotational movements to said shafts upon swinging movements of said hand lever, and means carried by said frame and releasably engageable by said hand lever to hold said hand lever in selected angular positions about the axis of the pivotal connection between said hand lever and said frame.

(References on following page)

References Cited in the file of this patent

UNITED STATES PATENTS

| Number | Name | Date |
|---|---|---|
| 875,245 | Darrow | Dec. 31, 1907 |
| 1,349,941 | Broome | Aug. 17, 1920 |
| 1,898,109 | Wickstrum | Feb. 21, 1933 |
| 2,154,952 | Mahlock | Apr. 18, 1939 |
| 2,214,176 | Portle | Sept. 10, 1940 |
| 2,388,692 | House | Nov. 13, 1945 |

FOREIGN PATENTS

| Number | Country | Date |
|---|---|---|
| 407,929 | France | Jan. 12, 1910 |
| 60,708 | Norway | Apr. 11, 1939 |